(12) United States Patent
Komori et al.

(10) Patent No.: US 6,865,909 B2
(45) Date of Patent: Mar. 15, 2005

(54) METHOD OF PREPARING CRT FUNNEL GLASS CAPABLE OF EFFECTIVELY RECYCLING ANOTHER GLASS MEMBER

(75) Inventors: Hiroshi Komori, Otsu (JP); Hiroki Yamazaki, Shiga (JP)

(73) Assignee: Nippon Electric Glass Co., Ltd, Otsu (JP)

( * ) Notice: Subject to any disclaimer, the term of this patent is extended or adjusted under 35 U.S.C. 154(b) by 0 days.

(21) Appl. No.: 10/886,354

(22) Filed: Jul. 7, 2004

(65) Prior Publication Data

US 2004/0259715 A1 Dec. 23, 2004

Related U.S. Application Data

(62) Division of application No. 10/202,373, filed on Jul. 24, 2002, now abandoned.

(30) Foreign Application Priority Data

Jul. 27, 2001 (JP) .......... 2001-228270

(51) Int. Cl.$^7$ .......... C03C 23/00; C03C 3/105; H01J 29/86; H01J 9/50
(52) U.S. Cl. .......... 65/23; 65/28; 313/477 R; 313/480; 445/2; 501/60; 501/62; 501/69; 501/70
(58) Field of Search .......... 501/60, 62, 69, 501/70; 313/447 R, 480; 65/23, 26; 445/2

(56) References Cited

U.S. PATENT DOCUMENTS

| | | | |
|---|---|---|---|
| 3,464,932 A | 9/1969 | Connelly et al. | |
| 4,376,829 A | 3/1983 | Daiku | |
| 4,438,211 A | 3/1984 | Mennemann et al. | |
| 4,520,115 A | 5/1985 | Speit et al. | |
| 4,521,524 A | 6/1985 | Yamashita | |
| 4,562,161 A | 12/1985 | Mennemann et al. | |
| 5,752,868 A * | 5/1998 | Yabuki et al. | 445/2 |
| 5,973,448 A * | 10/1999 | Segner et al. | 313/461 |
| 6,251,811 B1 | 6/2001 | Yanagisawa et al. | |
| 6,403,507 B2 | 6/2002 | Naumann et al. | |
| 6,752,675 B2 * | 6/2004 | Saimoto et al. | 445/2 |
| 2002/0115552 A1 | 8/2002 | Komori et al. | |
| 2003/0032543 A1 * | 2/2003 | Komori et al. | 501/60 |

FOREIGN PATENT DOCUMENTS

| | | | |
|---|---|---|---|
| EP | 0 657 392 | 6/1995 | |
| EP | 0 970 928 | 1/2000 | |
| EP | 970928 A1 * | 1/2000 | .......... C03C/3/102 |
| JP | 172 044 | 6/2001 | |

OTHER PUBLICATIONS

European Search Report.

* cited by examiner

*Primary Examiner*—Karl Group
*Assistant Examiner*—Elizabeth A. Bolden
(74) *Attorney, Agent, or Firm*—Collard & Roe, P.C.

(57) ABSTRACT

A method for producing CRT funnel glass having a glass composition containing MgO, CaO, SrO, BaO and ZnO as essential components. Further, the total content of MgO, CaO, SrO, BaO and ZnO falls within a range of 5 to 13 mass %. As a glass material of the CRT funnel glass, CRT panel glass or CRT neck glass may be used. The method comprises preparing the glass material so as to contain MgO, CaO, SrO, BaO, and ZnO as essential components and so that the total content of MgO+CaO+SrO+BaO+ZnO falls within a range of 5 to 13 mass %; and melting the glass material.

6 Claims, No Drawings

METHOD OF PREPARING CRT FUNNEL GLASS CAPABLE OF EFFECTIVELY RECYCLING ANOTHER GLASS MEMBER

CROSS REFERENCE TO RELATED APPLICATIONS

This is a divisional of U.S. patent application Ser. No. 10/202,373, filed on Jul. 24, 2002 now abandoned, the disclosure of which is hereby incorporated by reference. This application also claims priority under 35 U.S.C. 119 of Japanese Patent Application No. 228270/2001, filed on Jul. 27, 2001.

BACKGROUND OF THE INVENTION

The present invention relates to a method of producing CRT funnel glass which connects panel glass for displaying a video image and neck glass equipped with an electron gun for projecting the video image.

An envelope of a CRT comprises a panel portion for projecting video images, a tubular neck portion with an electron gun arranged therein, and a flare-shaped funnel portion connecting the panel portion and the neck portion with each other. The panel portion, the neck portion and the funnel portion are in the form of glass members, respectively. Electron beams emitted from the electron gun excite phosphors arranged on an inner surface of the panel portion to emit light so that the video images are projected on the panel portion. At this time, X-rays bremsstrahlung are produced inside the CRT. X-rays bremsstrahlung adversely affect human bodies when leaked to the exterior of the CRT through the envelope. Therefore, the envelope of this type is required to have a high X-ray absorbability.

CRTs are classified broadly into a black-and-white CRT bulb and a color CRT bulb. Generally, a panel portion of the black-and-white CRT bulb (hereinafter referred to as "black-and-white panel") is required that its glass is not colored due to electron beams and X-rays. The black-and-white panel is made of glass containing about 5 mass % of PbO. A panel portion of the color CRT bulb (hereinafter referred to as "color panel") is used at higher voltages as compared with the black-and-white panel, and thus is required more severely that its glass is not colored due to electron beams and X-rays. Therefore, the color panel is made of glass containing no PbO but containing SrO and BaO.

Since the neck portion is small in thickness, it is required to have a higher X-ray absorption coefficient. Therefore, the neck portion is made of glass containing no less than 20 mass % of PbO.

For equalizing the potential within a CRT bulb upon emitting electron beams from an electron gun, the funnel portion is coated with a carbon conductive film (carbon DAG) on an inner and an outer surface thereof. Thus, in addition to having a high X-ray absorbability, the funnel portion is also required to have a water durability to an extent for preventing contamination of its glass surface due to alkali effusion. Therefore, the funnel portion is made of glass containing no less than 10 mass % of PbO and about 5 mass % of MgO+CaO.

The panel portion and the funnel portion are joined together by sealing in case of the black-and-white CRT bulb, and by a PbO frit made of glass containing PbO in case of the color CRT bulb. The funnel portion and the neck portion are joined together by sealing.

On the other hand, in recent years, recycling of CRT bulb glass members has been advanced. Specifically, glass members of CRT bulbs are first classified into black-and-white bulb glass members and color bulb glass members, which are then further classified into groups of panel glass members, funnel glass members and neck glass members. Then, the glass members are immersed per group into a chemical liquid to remove phosphors, carbon DAGs, frits and so on. Subsequently, the glass members are comminuted per group and the comminuted glass members are used as a glass material for producing glass members of the same group, so that recycling is carried out.

The reason why the glass members should be strictly classified as described above is that, for example, if the glass members containing PbO, such as the black-and-white panels, are mixed into a glass material of the color panels, the color panels made of this glass material are subjected to coloration due to electron beams and X-rays.

Further, if the frits are not removed completely from the color panels, the same problem will be raised.

However, the complete classification of the glass members per group as described above requires much time and labor, and thus leads to the increase in production cost. Further, there is also a problem that a demand for the black-and-white CRT bulb glass is small and thus the production amount thereof is limited, so that complete recycling can not be achieved with respect to the black-and-white CRT bulb glass.

In view of the above, the color panels with the adhering frits, the black-and-white panels and the neck glass members with the attached funnel glass members are now being recycled as a material of the funnel glass which is PbO glass as described above.

On the other hand, the black-and-white panels, the color panels and the neck glass members contain large amounts of SrO and BaO. Thus, if such recycling is performed, SrO and BaO are mixed into the funnel glass. Further, since the amounts of the black-and-white panels, the color panels and the neck glass members to be recycled are not fixed, the rate of the recycled glass contained in a material of the funnel glass fluctuates and, following this, the amounts of contained SrO and BaO also-fluctuate.

If SrO and BaO are mixed into the funnel glass, a thermal expansion coefficient and an annealing point of the glass are increased, while a molding temperature thereof is lowered. The increase of the thermal expansion coefficient or annealing point of the glass causes generation of a stress beyond an allowable range when sealing is performed between a panel glass member and a funnel glass member or between a funnel glass member and a neck glass member, thereby to lower the strength of a CRT bulb. Further, the fluctuation of the contained amounts of SrO and BaO causes the molding temperature to be unconstant so that the temperature condition upon forming the glass fluctuates to induce lowering of the productivity.

Even if the content of $Al_2O_3$, PbO or alkali metal oxide ($Na_2O$, $K_2O$) in the glass is adjusted in an attempt to correct the glass characteristics which have been changed due to entering of SrO and BaC, it is hardly possible to lower the thermal expansion coefficient or annealing point of the glass, or increase the molding temperature thereof. In view of this, in general, the content of MgO or CaO in the glass is reduced to prevent these characteristics from changing.

However, if the content of MaO or CaO is reduced, the water durability of the glass is deteriorated, so that alkali effusion tends to occur while keeping the funnel glass in the form of funnel glass members, resulting in contamination of the surfaces thereof. If a carbon DAG is applied to such a funnel glass member, DAG repelling occurs at contaminated portions so that the carbon DAG can not be applied uniformly. As a result, the potential within a CRT bulb can not be equalized, meaning that such a funnel glass member has a critical defect for forming the funnel portion of the CRT bulb.

If the surface of the funnel glass member is washed using strong acid before applying the carbon DAG, the DAG repelling can be suppressed. However, it is not desirable in view of environmental sanitation and in view of increased cost due to the increase in production process.

Further, there has been developed a technique wherein an organic or inorganic water soluble protective film is applied to the glass surface immediately after forming the funnel glass member, then the glass surface is washed with water immediately before applying the carbon DAG, thereby to remove the film and contaminants adhered thereon. However, if such a funnel glass member is kept over a long term, it is possible that alkali effusion occurs.

SUMMARY OF THE INVENTION

In view of the above, it is an object of the present invention to provide a method of producing a CRT funnel glass, which is capable of simultaneously achieving compensation of the coefficient of thermal expansion and the viscosity and suppression of the alkali effusion even if used panel glass and used neck glass are used as the glass material to produce the CRT funnel glass. For this purpose, in the present invention, the glass material is prepared which contains MgO, CaO, SrO, BaO, and ZnO as essential components so that the total content of MgO+CaO+SrO+BaO+Zno falls within a range of 5 to 13 mass %. By melting the glass material, the CRT funnel glass capable of simultaneously achieving compensation of the coefficient of thermal expansion and the viscosity and suppression of alkali effusion is obtained.

DESCRIPTION OF THE PREFERRED EMBODIMENTS

Upon producing CRT funnel glass, a glass composition thereof is caused to contain MgO, CaO, SrO, BaO and ZnO as essential components. Further, the total content of MgO, CaO, SrO, BaO and ZnO is set to be within a range of 5 to 13 mass %. For producing such CRT funnel glass, CRT panel glass or CRT neck glass may be used as a glass material thereof.

The CRT funnel glass contains as an essential component a given amount of ZnO which largely improves the water durability of glass. Thus, even if the content of MaO or Cao is reduced for suppressing a change of the glass characteristics due to entering of SrO and BaO contained in the panel glass or neck glass, the water durability of the CRT funnel glass can be maintained, and therefore, the alkali effusion can be suppressed even if it is kept over a long term. For suppressing the alkali effusion of the funnel glass over a long term, it is necessary that an amount of alkali elution from the glass is 0.4 mg or less. Since the CRT funnel glass contains ZnO, the alkali elution amount can be suppressed.

By adjusting the total content of MgO, CaO, SrO, BaO and ZnO within a range of 5 to 13 mass %, the thermal expansion coefficient of the glass at 30 to 380° C. falls within a range of $97 \times 10^{-7}$ to $104 \times 10^{-7}$/° C., and the annealing point of the glass falls within a range of 470 to 495° C. Thus, when sealing is performed between a panel glass member and a funnel glass member made of the thus produced funnel glass or between such a funnel glass member and a neck glass member, no stress beyond an allowable range is generated so that the strength of a CRT bulb can be ensured. Further, the temperature corresponding to a viscosity of 104 dPa·s can be within a range of 940 to 990° C., and thus it is not necessary to change the glass forming condition, resulting in that the productivity can be maintained. Preferably, the total content of MgO, CaO, SrO, BaO and ZnO falls within a range of 6 to 11 mass %.

The CRT funnel glass thus produced contains PbO in a range of 10 to 30 mass %. This realizes an X-ray absorption coefficient of 40 $cm^{-1}$ or greater at 0.6 to provide the glass with a high X-ray shieldability.

Preferably, the glass composition of the CRT funnel glass contains, in mass %, 46 to 58% $SiO_2$, 0.5 to 6% $Al_2O_3$, 10 to 30% PbO, 0.01 to 5% MgO, 0.01 to 6% CaO, 1 to 5% SrO, 1 to 5% BaO, 0.01 to 5% ZnO, 5 to 13% MgO+CaO+SrO+BaO+ZnO, 3 to: 9% $Na_2O$, 4 to 11% $K_2O$, and 0.05 to 1% $Sb_2O_3$. The reason for this glass composition will be explained hereinbelow.

$SiO_2$ is a component serving as a network former of the glass. If the content of $SiO_2$ falls within a range of 46 to 58 mass %, the formation becomes easy, and further, the matching with the thermal expansion coefficient of neck glass is improved. Preferably, the content of $SiO_2$ falls within a range of 47 to 57 mass %.

$Al_2O_3$ is also a component serving as a network former of the glass. If the content of $Al_2O_3$ falls within a range of 0.5 to 6 mass %, the formation becomes easy, and further, the matching with the thermal expansion coefficient of the neck glass is improved. Preferably, the content of $Al_2O_3$ falls within a range of 1 to 5 mass %.

PbO is a component which improves the X-ray absorption coefficient of the glass. If the content of PbO falls within a range of 10 to 30 mass %, the X-ray absorbability is sufficient, and further, the viscosity of the glass is suitable for the formation. Preferably, the content of PbO falls within a range of 15 to 27 mass %.

MgO is a component serving to adjust the thermal expansion coefficient and the viscosity of the glass and to improve the water durability of the glass. If the content of MgO is less than 0.01 mass %, an amount of alkali elution from the glass increases to make it difficult to suppress the DAG repelling. If the content of MgO is large, the glass tends to be devitrified. If the content of MaO is 5 mass % or less, the glass can be melted without being devitrified. Preferably, the content of MgO falls within a range of 0.1 to 4 mass %.

CaO, like MgO, is a component serving to adjust the thermal expansion coefficient and the viscosity of the glass and to improve the water durability of the glass. If the content of CaO is less than 0.01 mass %, an amount of alkali elution from the glass increases to make it difficult to suppress the DAG repelling. If the content of CaO is large, the glass tends to be devitrified. If the content of CaO is 6 mass % or less, the glass can be melted without being devitrified. Preferably, the content of CaO falls within a range of 0.1 to 5 mass %.

SrO is a component serving to facilitate melting of the glass, to adjust the thermal expansion coefficient and the viscosity, and to improve the X-ray absorbability. If the content of SrO is 1 mass % or greater, a large amount of glass can be recycled, and thus the effect is large for glass recycling. If the content of SrO is large, the glass tends to be devitrified. If the content of SrO is 5 mass % or less, the glass can be melted without being devitrified. Preferably, the content of SrO falls within a range of 1 to 4 mass %.

BaO is a component serving to facilitate melting of the glass, to adjust the thermal expansion coefficient and the viscosity, and to improve the X-ray absorbability. If the content of BaO is 1 mass % or greater, a large amount of glass can be recycled, and thus the effect is large for glass recycling. If the content of BaO is large, the glass tends to be devitrified. If the content of BaO is 5 mass % or less, the glass can be melted without being devitrified. Preferably, the content of BaO falls within a range of 1 to 4 mass %.

If a value of (MgO+CaO)/(SrO+BaO) is 0.47 or greater, the effect increases in reducing the amount of alkali elution from the funnel glass to suppress the DAG repelling. Preferably, the value of (MgO+CaO)/(SrO+BaO) is 0.50 or greater.

ZnO is a component serving to improve the water durability of the glass. If the content of ZnO is 0.01 mass % or greater, the amount of alkali elution from the glass is reduced to suppress the DAG repelling. If the content of ZnO is large, the glass tends to be devitrified. If the content of ZnO is 5 mass % or less, the glass can be melted without being devitrified.

If the total content of MgO, CaO, SrO, BaO and ZnO falls within a range of 5 to 13 mass %, the thermal expansion coefficient of the glass can be within a range of $97 \times 10^{-7}$ to $104 \times 10^{-7}/°$ C., the annealing point of the glass can be within a range of 470 to 495° C., and the temperature corresponding to a viscosity of 104 dPa·s can be within a range of 940 to 990° C. If the total content of MgO, CaO, SrO, BaO and ZnO falls outside the foregoing range, the glass characteristics fall outside the foregoing ranges, so that an undesirable situation is resulted when performing the foregoing sealing, or when forming the funnel glass. Preferably, the total content of MgO, CaO, SrO, BaO and ZnO falls within a range of 6 to 11 mass %.

$Na_2O$ is a component serving to adjust the thermal expansion coefficient and the viscosity. If the content of $Na_2O$ falls within a range of 3 to 9 mass %, the matching with the thermal expansion coefficient of the neck glass is improved, and further, the viscosity of the glass is suitable for the formation. Preferably, the content of $Na_2O$ falls within a range of 4 to 8 mass %.

$K_2O$, like $Na_2O$, is a component serving to adjust the thermal expansion coefficient and the viscosity. If the content of $K_2O$ falls within a range of 4 to 11 mass %, the matching with the thermal expansion coefficient of the neck glass is improved, and further, the viscosity of the glass is suitable for the formation. Preferably, the content of $K_2O$ falls within a range of 5 to 10 mass %.

$Sb_2O_3$ is a component serving to act as a fining agent. If the content of $Sb_2O_3$ increases, the glass tends to be devitrified, but no problem is raised until it increases to 2 mass %. Preferably, the content of $Sb_2O_3$ falls within a range of 0.05 to 1 mass %.

Hereinbelow, CRT funnel glass will be explained using examples according to the preferred embodiment of the present invention and comparative examples.

Table 1 shows examples (samples Nos. 1 to 6) according to the preferred embodiment of the present invention, and Table 2 shows comparative examples (samples Nos. 7 to 11). Among the comparative examples, the sample No. 11 is the conventional funnel glass.

TABLE 1

| | EXAMPLES | | | | | |
|---|---|---|---|---|---|---|
| | No. 1 | No. 2 | No. 3 | No. 4 | No. 5 | No. 6 |
| composition (mass %) | | | | | | |
| $SiO_2$ | 52.0 | 52.5 | 52.3 | 52.8 | 51.0 | 52.3 |
| $Al_2O_3$ | 3.6 | 3.8 | 3.4 | 3.0 | 4.0 | 3.8 |
| PbO | 21.5 | 21.2 | 20.8 | 21.5 | 21.0 | 21.3 |
| MgO | 2.0 | 0.9 | 1.5 | 2.6 | 3.0 | 1.5 |
| CaO | 2.3 | 2.0 | 2.6 | 2.0 | 1.0 | 3.2 |
| SrO | 2.1 | 2.8 | 2.7 | 1.6 | 2.0 | 1.9 |
| BaO | 2.1 | 2.8 | 2.9 | 1.8 | 3.0 | 2.1 |
| ZnO | 0.3 | 0.2 | 0.1 | 0.5 | 0.8 | 0.2 |
| $Na_2O$ | 6.5 | 6.3 | 6.5 | 6.6 | 6.1 | 6.3 |
| $K_2O$ | 7.4 | 7.3 | 7.0 | 7.1 | 7.3 | 7.2 |
| $Sb_2O_3$ | 0.2 | 0.2 | 0.2 | 0.5 | 0.8 | 0.2 |
| thermal expansion coefficient [30–380° C.] ($\times 10^{-7}/°$ C.) | 103 | 100 | 100 | 100 | 98 | 100 |
| annealing point (° C.) | 480 | 486 | 495 | 475 | 480 | 486 |
| molding temperature (° C.) | 960 | 970 | 975 | 960 | 980 | 955 |
| alkali elution amount (mg) | 0.26 | 0.31 | 0.31 | 0.28 | 0.27 | 0.28 |
| X-ray absorption coefficient (0.6 Å, cm$^{-1}$) | 68 | 67 | 67 | 67 | 67 | 66 |

TABLE 2

| | COMPARATIVE EXAMPLES | | | | |
|---|---|---|---|---|---|
| | No. 7 | No. 8 | No. 9 | No. 10 | No. 11 |
| composition (mass %) | | | | | |
| $SiO_2$ | 55.0 | 56.8 | 53.9 | 52.3 | 50.4 |
| $Al_2O_3$ | 4.0 | 4.0 | 4.0 | 3.0 | 4.8 |
| PbO | 21.5 | 21.5 | 23.5 | 18.0 | 24.0 |
| MgO | — | 0.2 | 1.0 | 3.0 | 1.8 |
| CaO | — | 0.3 | 1.0 | 3.0 | 3.8 |
| SrO | 2.0 | 0.2 | 1.0 | 4.0 | — |
| BaO | 3.0 | 3.0 | 1.0 | 3.0 | — |
| ZnO | 0.5 | — | 0.9 | 0.5 | — |
| $Na_2O$ | 5.5 | 5.5 | 6.5 | 6.5 | 6.5 |
| $K_2O$ | 8.0 | 8.0 | 7.0 | 6.5 | 8.2 |
| $Sb_2O_3$ | 0.5 | 0.5 | 0.2 | 0.2 | 0.5 |
| thermal expansion coefficient [30–380° C.] ($\times 10^{-7}/°$ C.) | 100 | 99 | 98 | 98 | 101 |
| annealing point (° C.) | 470 | 470 | 455 | 500 | 480 |
| molding temperature (° C.) | 975 | 980 | 970 | 980 | 960 |
| alkali elution amount (mg) | 0.43 | 0.45 | 0.33 | 0.26 | 0.30 |
| X-ray absorption coefficient (0.6 Å, cm$^{-1}$) | 66 | 66 | 67 | 62 | 67 |

Each of the samples given in Tables 1 and 0.2 was prepared in the following manner.

First, materials were mixed together to have the composition defined in Table 1 or 2, thereby to prepare a batch. Then, the batch was put into a platinum crucible and melted in a melting furnace at 1,550° C. for 4 hours. For obtaining homogeneous glass, stir was performed for 3 minutes during melting the batch using a platinum rod, thereby to carry out degassing. Thereafter, the molten glass was formed into a predetermined shape, then cooled slowly.

Then, for each of the samples thus obtained, the thermal expansion coefficient, the annealing point, the molding temperature, the water durability and the X-ray absorption coefficient were measured. The results are shown in Tables 1 and 2. With respect to the thermal expansion coefficient, the mean thermal expansion coefficient at 30 to 380° C. was measured using a dilatometer.

The annealing point was measured according to ASTM C336. With respect to the molding temperature, the temperature corresponding to a viscosity of 104 dPa·s of the glass was measured using the platinum ball pulling method. The alkali elution amount was derived according to JIS R3502. The water durability was evaluated using the alkali elution amount. A larger value of the alkali elution amount represents a lower water durability. The X-ray absorption coefficient was obtained by calculating the absorption coefficient at a wavelength of 0.6 with reference to the glass composition and the density.

As seen from Table 1 showing the samples of the examples according to the preferred embodiment, each of the samples Nos. 1 to 6 contained all of MgO, CaO, SrO, BaO and ZnO, and the total contents of these components were in a range of 8.5 to 9.9 mass %. Thus, the thermal expansion coefficients were in a range of $98 \times 10^{-7}$ to $103 \times 10^{-7}/°$ C., and the annealing points were in a range of 475 to 495° C. Accordingly, even if the sealing with a panel glass member or neck glass member is carried out, it is expected that no stress is generated beyond an allowable range. Further, the molding temperatures were in a range of 955 to 980° C. Thus, it is not necessary to change the glass forming condition, and the productivity is not lowered. Further, since each sample contained no less than 0.1 mass % ZnO, the alkali elution amounts were 0.31 mg or less, and thus the water durability was also similar to the conventional funnel glass. In addition, the X-ray absorption coefficients were high, i.e. 66 $cm^{-1}$ or greater.

In contrast, as seen from Table 2 showing the samples of the comparative examples, since the sample No. 7 did not contain MgO or CaO and the sample No. 8 did not contain ZnO, the alkali elution amounts were large, i.e. 0.43 mg or greater, and thus the water durability was bad. With respect to the sample No. 9, since the total content of MgO, CaO, SrO, BaO and ZnO was 4.9 mass %, the annealing point was low, i.e. 455° C. With respect to the sample No. 10, since the total content of these components was 13.5 mass %, the annealing point was high, i.e. 500° C. Subsequently, a DAG repelling test was conducted with respect to the samples Nos. 1, 7 and 8.

First, funnel glass was prepared using the composition of each of the samples Nos. 1, 7 and 8. Then, each funnel glass was held at 80° C. ambient temperature and 100% humidity for 100 hours, then immersed in a water bath with 40° C. deionized water for 30 seconds, then dried and applied with a carbon DAG.

As a result, no DAG repelling occurred with respect to the funnel glass of the sample No. 1. On the other hand, with respect to the funnel glass of each of the samples Nos. 7 and 8, alkali effusion occurred on the surface thereof to cause DAG repelling.

As seen from the foregoing, even if the panel glass or neck glass containing SrO and BaO is used as a glass material, the funnel glass can be produced without changing the characteristics largely.

In the foregoing preferred embodiment, the samples were prepared using the oxide materials. However, the same effect can also be obtained by comminuting the panel glass or neck glass, mixing the comminuted glass, instead of the SrO and BaO materials, with a funnel glass material to prepare a mixed batch and melting the mixed batch.

What is claimed is:

1. A method of producing CRT funnel glass by using, as glass material, at least one of CRT panel glass and CRT neck glass, the method comprising the steps of:

preparing the glass material so as to contain MgO, CaO, SrO, BaO, and ZnO as essential components and so that the total content of MgO+CaO+SrO+BaO+ZnO falls within a range of 5 to 13 mass %; and melting the glass material.

2. The method according to claim 1, wherein the preparing step is carried out so that the content of SrO and the content of BaO are each 1 mass % or greater.

3. The method according to claim 1, wherein the preparing step is carried out so that the CRT funnel glass has an alkali elution amount of 04 mg or less.

4. The method according to claim 1, wherein the preparing step is carried out so that the CRT funnel glass has a value of (MgO+CaO)/(SrO+BaO) being 0.47 or greater.

5. The method according to claim 1, wherein the preparing step is carried out so-that the CRT funnel glass has a thermal expansion coefficient of said glass at 30 to 380° C. falling within a range of $97 \times 10^{-7}$ to $104 \times 10^{-7}/°$ C., an annealing point of said glass falling within a range of 470 to 495° C., and a temperature corresponding to a viscosity of 104 dPa·Es of said glass and falling within a range of 940 to 990° C.

6. The method according to claim 1, wherein the preparing step is carried out so that the CRT funnel glass has a glass composition containing, in mass %, 46 to 58% $SiO_2$, 0.5 to 6% $Al_2O_3$, 10 to 30% PbO, 0.01 to 5% MgO, 0.01 to 6% CaO, 1 to 5% SrO, 1 to 5% BaO, 0.01 to 5% ZnO, 5 to 13% MgO+CaO+SrO+BaO+ZnO, 3 to 9% $Na_2O$, 4 to 11% $K_2O$, and 0 to 2% $Sb_2O_3$.

* * * * *